United States Patent Office.

EDWARD WATSON, OF GRAND RAPIDS, MICHIGAN.

COMPOSITION OF MATTER FOR RETARDING THE SETTING OF PLASTER.

SPECIFICATION forming part of Letters Patent No. 445,211, dated January 27, 1891.

Application filed December 20, 1890. Serial No. 375,294. (No specimens.)

*To all whom it may concern:*

Be it known that I, EDWARD WATSON, a citizen of the United States, residing at Grand Rapids, in the county of Kent and State of Michigan, have invented a new and useful Composition of Matter to Restrain the Solidification of Calcined Gypsum, of which the following is a specification.

In the composition of plaster calcined gypsum is largely used. In working the plaster it is often desirable to retard the setting. Other materials than calcined gypsum—such as sand, lime, and whatever may be desired—are in practice mixed with calcined gypsum when the mortar is made or at a previous time.

My object is to prepare the calcined gypsum so that it will be slow in setting, and so that the time of setting may be governed by the quantity of my restraining material used in proportion to the quantity of calcined gypsum. A very small portion will have a restraining action, and the time of setting may thus be governed by using more or less of the restraining material, as may be desired in practice.

In preparing my material for a restrainer I proceed as follows: I take the clean-washed hair as it is prepared for plastering and reduce it to a solution in water by boiling it with an alkali, caustic soda or potash. In practice I use sal-soda or soda-ash and render it caustic by boiling with enough lime to combine with the carbonic acid, and thus form a solution of caustic alkali. In practice I mix all the materials together—hair, soda or potash, and lime—add water, and boil until the hair is entirely dissolved and a limpid solution is made. After effecting the complete solution of the hair it may be used in the liquid form and thus mixed with the water in which the plaster is to be mixed, or it may be reduced to a dry mass and finely powdered, and then mixed dry with the dry calcined plaster in proper proportions, so as to be ready for use by mixing with water.

The proportions of material I use in forming the solution of hair are as follows: Hair, one pound; sal-soda or soda-ash or an equivalent of potash, one pound; lime, half a pound; water, half a gallon or more. Mix all together and boil until the hair is entirely dissolved. If then desirable to be used in the liquid form, the clear liquid may be strained out and at once mixed with the plaster, or the entire mass may be reduced to a dry powder and then mixed with the dry calcined gypsum either before or at the time of mixing the mortar. This makes an excellent material for restraining the setting of plaster, and has more power pound for pound than any other material I know of. It is freely soluble in cold water and thus intimately mixed with the mortar, and produces uniform results and appears to render the resulting plaster harder when dry than plaster set without any restraining material.

The quantity of my material to be used with each ton of calcined gypsum will depend upon the time desired to retard the setting of the plaster. It must be estimated by the weight of dry hair used in forming the solution. One pound of hair treated as described will retard the setting of a ton of calcined gypsum several minutes, and the quantity should be estimated by the time desired to set the plaster. About five pounds to a ton will be all that is required for general use. Too much would so set the plaster back as to in many cases be not practicable.

What I claim, and desire to secure by Letters Patent of the United States, is—

1. The herein-described composition of matter to be used for restraining the setting of calcined gypsum, consisting of a solution of the substance of hair, as specified.

2. The herein-described composition of matter to be used for restraining the setting of calcined gypsum, consisting of a solution of the substance of hair and reduced to a powder, substantially as specified.

EDWARD WATSON.

Witnesses:
C. L. HARVEY,
C. J. DEYOUNG.